United States Patent [19]

Glaser et al.

[11] 4,050,008
[45] Sept. 20, 1977

[54] CONTROL UNIT FOR AN A-C CONTROL ELEMENT WITH FULL-WAVE CONTROL

[75] Inventors: Helmut Glaser, Forchheim; Ludwig Schick, Erlangen, both of Germany

[73] Assignee: Siemens Aktiengesellschaft, Munich, Germany

[21] Appl. No.: 674,808

[22] Filed: Apr. 8, 1976

[30] Foreign Application Priority Data

Apr. 17, 1975 Germany .............................. 2516934

[51] Int. Cl.² .............................................. G05F 1/44
[52] U.S. Cl. ..................................... 323/19; 323/18; 323/24
[58] Field of Search .................. 307/133, 252 UA; 323/18, 19, 22 SC, 24

[56] References Cited

U.S. PATENT DOCUMENTS

| 3,356,784 | 12/1967 | Bertioli et al. ................... 323/22 SC |
| 3,363,143 | 1/1968 | Cavanaugh ...................... 323/24 UX |
| 3,365,654 | 1/1968 | Johnston .......................... 323/22 SC |

*Primary Examiner*—A. D. Pellinen
*Attorney, Agent, or Firm*—Kenyon & Kenyon, Reilly, Carr & Chapin

[57] ABSTRACT

A control unit for the full-wave control of an a-c control element. The control unit comprises a push-pull oscillator for generating control pulses for the thyristors of the control element. The oscillator includes a transformer and is followed by rectifiers which are responsive to the output of the transformer. Additionally circuitry is provided for gating the output of the control unit during each first half-wave of a wave packet of the a-c supply voltage and for performing phase gating over several half-waves when the control unit is switched on.

2 Claims, 2 Drawing Figures

CONTROL UNIT FOR AN A-C CONTROL ELEMENT WITH FULL-WAVE CONTROL

BACKGROUND OF THE INVENTION

1. Field of the Invention

The invention relates to a control unit for controlling an a-c control element having full-wave control and, in particular, to a control unit of a type comprising a pulse generator which is synchronized to a line voltage and which generates firing pulses that can be applied to the firing electrodes of the thyristors of an a-c control element via a pulse transformer.

2. Description of the Prior Art

Control units of the above type and a-c control elements controlled thereby are known in the art and are commercially available. Such units and control elements are predominantly used for purposes of temperature control, and can be used to regulate temperature in conjunction with a continuous or bang-bang (on-off) control. Via these prior art control units, a pulse of approximately 180° is applied to the firing electrodes of the thyristors of the a-c control element for each gated halfwave of the a-c supply voltage. These pulses necessitate the use of large transformers which make the arrangements relatively expensive.

It is therefore an object of the present invention to provide a control unit of the above type which is designed so as to eliminate the need for large transformers.

SUMMARY OF THE INVENTION

In accordance with the principles of the present invention the above and other objectives are realized in a control unit of the above type by providing therein as the pulse generator a push-pull oscillator which includes a transformer and which is followed by full-wave rectifiers. Additionally, the control unit further includes a control means including a bistable multivibrator for switching on the push-pull oscillator at the beginning of a half-wave of the a-c supply voltage and for switching off the oscillator at the end of a half-wave of opposite sign, in dependence on a control signal.

In the control unit of the invention, the push-pull oscillator is thus switched-on at the beginning of each full-wave packet called for by the control signal and remains in this state for the entire length of the packet. As a result, the recitified output of the push-pull oscillator is a continuous pulse during an entire full-wave packet. Such output can, therefore, be transmitted to the a-c control element using inexpensive commercially available transformers.

For providing synchronization, the control unit of the invention additionally includes a trigger pulse generator which generates an output trigger pulse at the zero-crossing of each period of the a-c supply voltage. These pulses are coupled to the trigger input of the bistable multivibrator. In this manner, it is ensured that the push-pull oscillator is always switched on only at the beginning of a half-wave and, as a result, that the generation of a firing pulse for a-c control element is only begun at such time.

Furthermore, where the a-c control element is being used to supply a load comprising a transformer, the control unit of the invention can be further modified to include a delay means for delaying the multivibrator output during the first half-wave of each full-wave packet. As a result, transformer in-rush effects can be avoided. Moreover, in order to avoid saturation conditions in inductive loads or transformers when the a-c control element is to be switched on, e.g., after a network failure, it is advantageous to additionally provide in the present control unit phase gating control means. Such means includes: a sawtooth generator operating at twice the frequency of the a-c supply voltage; an R-C member responsive to the output of the bistable multivibrator; a comparator responsive to the outputs of the sawtooth generator and the R-C member; and a digital logic member including an AND gate and being responsive to the comparator output and the delayed multivibrator output for generating the output signal of which turns the push-pull oscillator on and off. By use of the aforesaid means, phase-gating control is achieved when the a-c control element is switched on whereby the voltage-time areas of successive half-waves which are fed to the load are continuously increased and a saturated condition of the transformers is thereby avoided.

BRIEF DESCRIPTION OF THE DRAWINGS

The above and other features and aspects of the present invention will become apparent upon reading the following detailed description in conjunction with the accompanying drawings, in which.

DETAILED DESCRIPTION

Figure 1:
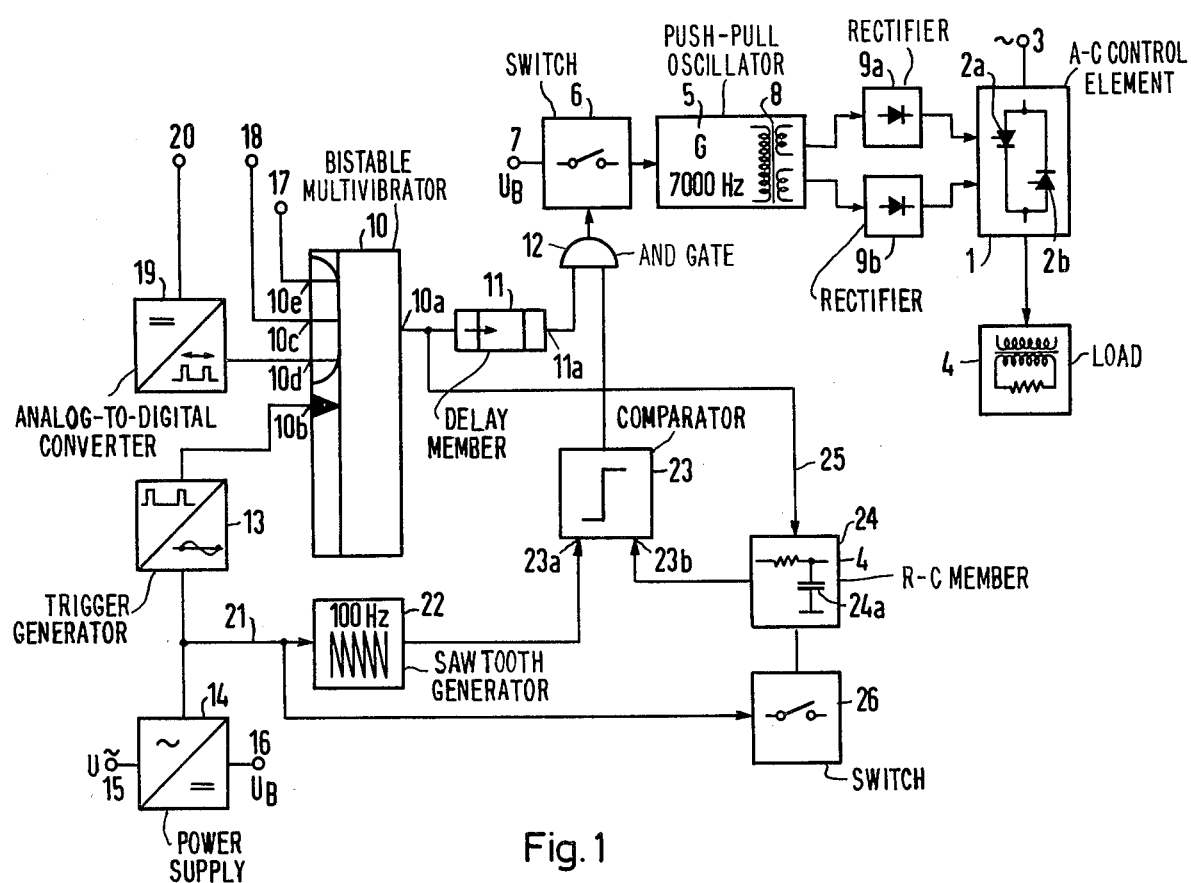
FIG. 1 shows a control unit in accordance with the principles of the present invention.

FIG. 1 shows a block diagram of the control unit in accordance with the principles of the present invention. The unit is to provide control for an a-c control element 1 having thyristors 2a and 2b connected antiparallel. The element 1 is connected via the terminals 3 to a single- or three-phase supply network and feeds a load 4 shown illustratively as a transformer.

The control unit of the invention comprises a push-pull oscillator 5 which generates firing pulses for the thyristors 2a, 2b of the element 1. The oscillator 5 operates at a frequency of between 5000 and 10,000 Hz, and can be connected, via a switch 6, to a terminal 7 which is being fed a supply voltage $U_B$. The output of the oscillator 5 is taken from the secondary windings of the transformer 8 of the oscillator and is fed to the firing electrodes of the thyristors 2a and 2b via the full-wave rectifiers 9a and 9b. When the push-pull oscillator 5 is switched on and the switch 6 is closed, a high-frequency signal comprised of individual rectangular pulses is present at its output. The latter signal is rectified by the rectifiers 9a and 9b to obtain a continuous pulse which is coupled to the firing electrodes of the thyristors 2a and 2b. The latter pulse continues to be present as long as the push-pull oscillator 5 remains switched on.

The switch 6 is actuated or controlled by a bistable multivibrator 10 whose output signal 10a is connected to a delay member 11 which delays the rising flank of the signal. The output 11a of the delay member 11 is connected to one input of an AND gate 12 whose output, in turn, is connected with actuating input of the switch 6.

The bistable multivibrator 10 has a trigger input 10b which is connected with the output of a clock or trigger generator 13. The latter generator is synchronized, via the power supply 14, to an a-c supply voltage U and is designed so that it generates at its output a trigger pulse prior to the start of each positive half-wave. The power supply 14 is fed, the a-c supply voltage U via the terminal 15 and it, in turn, generates at the terminal 16 the operating voltage $U_B$.

The bistable multivibrator 10 also has three other inputs 10e, 10c and 10d all of which are coupled to an OR logic circuit. The input 10e is fed from a terminal 17 to which, for example, pulse blocking signals can be applied while the unit is being switched on. The input 10c on the other hand, is fed from a terminal 18 to which an on-off control can be connected. The input 10d, in turn, is fed the output of an analog-to-digital converter 19 whose input is linked with a terminal 20 which is adapted to receive a continuous control signal. Control signals can be applied to the terminal 18 or 20.

The analog-to-digital converter 19 comprises an astable multivibrator having a duty cycle which can be varied by the control signal applied to the terminal 20. Its frequency is lower than the frequency of the a-c supply voltage. A wide control range can thereby be obtained.

The control unit of the invention further comprises a sawtooth generator 22 which operates at twice the network frequency and is synchronized to the a-c supply voltage via the line 21. The output of generator 22 is connected to one input 23a of a comparator stage 23. A second input 23b of the comparator stage 23 is connected to the tap of an R-C member 24 which is fed, via the line 25, with the output 10a of the bistable multivibrator 10. A switch 26 is arranged so as to permit the capacitor 24a of the R-C member 24 to be short-circuited and discharged for fast resetting if line voltage is no longer present, i.e., if the equipment is switched off or the network voltage has failed.

Figure 2:
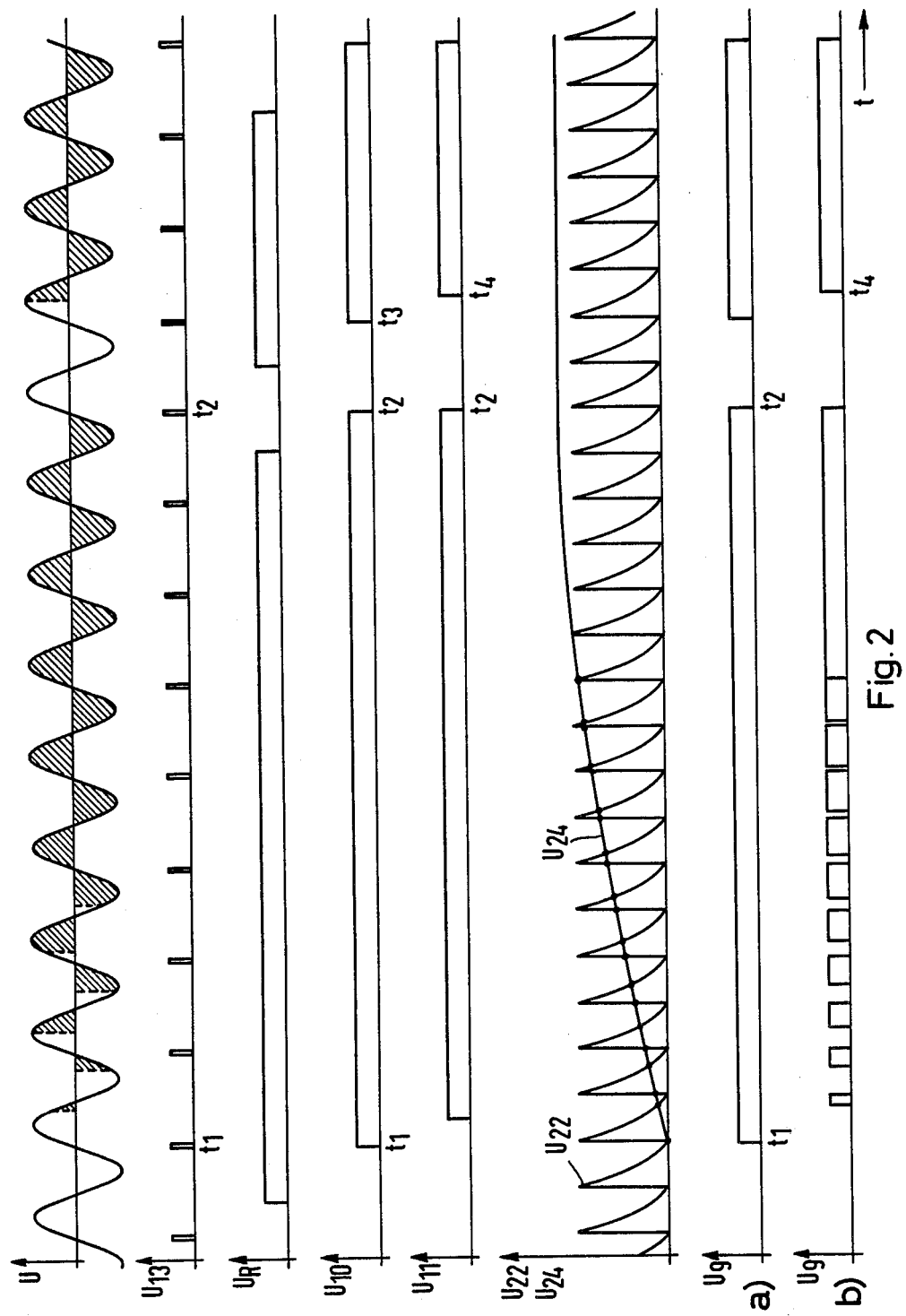
FIG. 2 illustrates waveform diagrams for some of the signals on the control unit of FIG. 1.

The operation of the control unit of FIG. 1 will be explained in detail with reference to FIG. 2. In the latter figure the following signals are plotted versus time: the a-c supply voltage U; the trigger pulses $U_{13}$ of the clock generator 13; a control signal $U_R$; the output signal $U_{10}$ of the bistable multivibrator 10; the output signal $U_{11}$ of the delay stage 11; the output signal $U_{22}$ of the sawtooth generator 22; the capacitor voltage $U_{24}$. Also plotted are the firing pulses $U_9$ present at the outputs of the recitifers 9a and 9b for the case where the element 1 is feeding an ohmic load and for the case where the element 1 is feeding a load comprising a transformer.

It will be first assumed that the a-c control element 1 is supplying an ohmic load. In such case, the output 10a of the bistable multivibrator 10 can be connected directly with the actuating input of the switch 6, and the delay stage 11, AND gate 12, sawtooth generator 22, R-C member 24 and the comparator stage 23 are not necessary. Thus, in this first assumed case, the voltages $U_{11}$, $U_{22}$ and $U_{24}$ in FIG. 2 need not be considered. If a control signal $U_R$ is applied to the terminal 18 or 20 and, thus, is present at the terminal 10c or 10d, respectively, then the bistable multivibrator 10 flips or changes state when the next trigger pulse arrives at the trigger input 10b. Thus, at the instant $t_1$, i.e., at the beginning of the next positive half-wave of the a-c supply voltage U, the multivibrator 10 changes to a state where a signal $U_{10}$ is present at its output 10a. The bistable multivibrator 10 remains in this switching state until the first occurrence of a trigger pulse after termination of the rear flank of the control signal $U_R$, i.e. until the instant $t_2$ at the end of a negative half-wave of the supply voltage U.

During the presence of the output signal $U_{10}$, the switch 6 is closed thereby connecting the push-pull oscillator 5 to the operating voltage $U_B$. In response thereto, the push-pull oscillator 5 operates immediately and presents to the thyristors 2a and 2b, via the rectifiers 9a and 9b, the firing pulses $U_9$ shown in diagram a) of FIG. 2. The particular thyristor 2a or 2b being fired by the firing pulses $U_9$ depends on the phase of the a-c supply voltage U. The a-c control element 1, therefore, carries current from the instant $t_1$ to the instant $t_2$, i.e., until the end of the negative half-wave of the voltage U, at which time the bistable multivibrator 10 changes state and the switch 6 is thereby opened causing the push-pull oscillator 5 to cease to oscillate.

In the situation where the load 4 fed by the element 1 comprises a transformer, as is depicted in FIG. 1, there is a danger that the transformer will go into saturation, due to hysteresis, if the transformer is driven by a full half-wave immediately after the element 1 is switched on. In addition, when the element 1 is switched on, particularly after a power failure, it is not known whether the transformer has positive or negative magnetization. Driving the transformer with the wrong half-wave would then also drive it into saturation. In order to avoid this so-called in-rush effect, a phase gating control is provided in the control unit of the invention by the delay stage 11, AND gate 12, sawtooth generator 22, R-C member 24 and comparative stage 23, these elements, as above indicated, not being necessary in the previously discussed situation of solely an ohmic load. With this phase gating control, the first half-wave, at the beginning of each full-wave packet is always gated off. This is achieved by the delay stage 11, which displaces the front flank of the control signal $U_{10}$ by a predetermined value which may be matched to the operating conditions by the delay time of the stage.

Additionally when the equipment is switched on, variable control angle gating occurs, the control angle of which shifts continuously from approximately 180° to zero. This gating is accomplished via the sawtooth generator 22 and the R-C member 24. More particularly the member 24, is charged by the output signal $U_{10}$ of the bistable multivibrator 10 and provides its output tap an exponentially rising voltage $U_{24}$. The sawtooth voltage $U_{22}$ and the voltage $U_{24}$ in turn, are fed to the comparator 23 which in response thereto generates an output signal only during the time intervals which extend between the points at which the voltage $U_{24}$ intersects successive falling and rising flanks of the sawtooth voltage $U_{22}$. As a result, the comparator output controls the AND gate 12 so that signal $U_{11}$ of the delay stage 11 is gated therethrough for controlling the switch 6 only during the aforesaid time intervals.

Thus, during the switching-on process, the phase-gating control acts with a continuously decreasing control angle until the capacitor 24a of the R-C member 24 is fully charged. At this time, the phase-gating control operates to only gate the first half-wave of each full-wave packet via the delay stage 11. The present operation of the control unit results in the generation of the firing pulses $U_9$ shown in diagram b) of FIG. 2. As can be seen, during the time the capacitor 24a is being charged and the voltage $U_{24}$ is intersecting with the sawtooth voltage $U_{22}$, one obtains discontinuous firing pulses whose length increase continously. When the capacitor 24a is fully charged the voltage $U_{24}$ no longer intersects the sawtooth $U_{22}$. As a result, during the application of the next control signal $U_R$, the gating control is due only to delay line 11 which gates the multivibrator output generated at the instant $t_3$ during the first half-wave of the next full-wave packet so that a firing pulse appears at the instant $t_4$.

As above indicated, the switch 26 shorts and discharges the capacitor 24a when line voltage is no longer present. In this manner, it is ensured that the capacitor 24a is first charged when the equipment is switched on and, thus, that during starting up of the equipment the control unit is providing phase-gating control.

In summary, it can be said that with the control unit of the present invention, the costly transformer of known arrangements is no longer needed and control of the a-c element 1 is realized in a simple manner and without excessive cost. It should be further added that the present control unit can be employed in situations other than those using full-wave control.

What is claimed is:

1. A control unit for use with an a-c supply voltage and for use with an a-c control element having full-wave control and including thyristors having firing electrodes, said control unit comprising:
  a push-pull oscillator for generating firing pulses for said thyristors; and
  control means for switching said oscillator on at the beginning of a first half-wave of said a-c supply voltage and for switching said oscillator off at the end of a second half-wave of said supply voltage, said second half-wave being opposite in sign to said first half-wave, said control means including:
  a bistable multivibrator;
  a delay line for delaying the signal generated by said multivibrator;
  a sawtooth generator operating at twice the frequency of said a-c supply voltage;
  an R-C circuit responsive to the output signal of said multivibrator;
  a comparator circuit responsive to the output signals of said sawtooth generator and said R-C circuit;
  and a digital logic means including an AND logic circuit responsive to the output signals of said comparator and said delay line for generating an output signal for switching said oscillator on and off.

2. A control unit in accordance with claim 1 in which said control means further includes:
  switch means for shorting the capacitor of said R-C circuit in the absence of said a-c supply voltage.

* * * * *